(12) United States Patent  
McCallister et al.

(10) Patent No.: US 10,200,749 B2  
(45) Date of Patent: Feb. 5, 2019

(54) METHOD AND APPARATUS FOR CONTENT REPLACEMENT IN LIVE PRODUCTION

(75) Inventors: Benjamin McCallister, Jacksonville, FL (US); Alex Holtz, Jacksonville, FL (US)

(73) Assignee: GVBB HOLDINGS S.A.R.L., Luxembourg (LU)

( * ) Notice: Subject to any disclaimer, the term of this patent is extended or adjusted under 35 U.S.C. 154(b) by 0 days.

(21) Appl. No.: 12/736,197

(22) PCT Filed: Apr. 8, 2009

(86) PCT No.: PCT/US2009/002201  
§ 371 (c)(1),  
(2), (4) Date: Sep. 17, 2010

(87) PCT Pub. No.: WO2009/126275  
PCT Pub. Date: Oct. 15, 2009

(65) Prior Publication Data  
US 2011/0023059 A1  Jan. 27, 2011

Related U.S. Application Data

(60) Provisional application No. 61/123,673, filed on Apr. 10, 2008.

(51) Int. Cl.  
*H04N 7/173* (2011.01)  
*H04N 21/44* (2011.01)  
(Continued)

(52) U.S. Cl.  
CPC . *H04N 21/44016* (2013.01); *H04N 21/23424* (2013.01); *H04N 21/234309* (2013.01);  
(Continued)

(58) Field of Classification Search  
None  
See application file for complete search history.

(56) References Cited

U.S. PATENT DOCUMENTS 5,805,974 A    9/1998  Hite et al.  
7,080,392 B1*  7/2006  Geshwind .................. 725/34  
(Continued)

FOREIGN PATENT DOCUMENTS

CA    2558488    9/2005  
EP    1247220    7/2001  
(Continued)

OTHER PUBLICATIONS

Shimizu, S. et al: "View Scalable Multiview Video Coding Using 3-D Warping with Depth Map", IEE Transactions on Circuits and Systems for Video Technology, vol. 17, No. 11, Nov. 2007.  
(Continued)

*Primary Examiner* — Mushfikh I Alam  
(74) *Attorney, Agent, or Firm* — Arent Fox LLP

(57) ABSTRACT

The insertion of an advertisement or other new content into a time slot between content segments advantageously occurs by selecting the new segment to fill its associated slot as closely as possible. Play out of a successive content segment occurs for distribution over at least one of a first set of channels and at least one second channel until the occurrence of the time slot whereupon the new content segment undergoes play out for distribution over the at least one second channel. If the new content segment has a duration longer than the time slot, the length of at least one content segment gets reduced to provide substantially seamless play out.

29 Claims, 2 Drawing Sheets

(51) Int. Cl.
*H04N 21/234* (2011.01)
*H04N 21/2343* (2011.01)
*H04N 21/242* (2011.01)
*H04N 21/81* (2011.01)

(52) U.S. Cl.
CPC ... *H04N 21/234363* (2013.01); *H04N 21/242* (2013.01); *H04N 21/812* (2013.01)

(56) References Cited

U.S. PATENT DOCUMENTS

| | | | | |
|---|---|---|---|---|
| 7,602,846 | B1* | 10/2009 | Wu et al. | 375/240.12 |
| 8,156,532 | B2* | 4/2012 | Shinkai | 725/116 |
| 2001/0003846 | A1* | 6/2001 | Rowe | G11B 27/031 725/47 |
| 2002/0069265 | A1* | 6/2002 | Bountour | H04N 7/181 709/219 |
| 2003/0046431 | A1* | 3/2003 | Belleguie | H04N 21/235 709/246 |
| 2004/0103439 | A1* | 5/2004 | Macrae | H04N 5/4403 725/109 |
| 2004/0158858 | A1 | 8/2004 | Paxton et al. | |
| 2004/0189873 | A1* | 9/2004 | Konig et al. | 348/607 |
| 2005/0010944 | A1* | 1/2005 | Wright et al. | 725/22 |
| 2005/0204381 | A1* | 9/2005 | Ludvig et al. | 725/34 |
| 2006/0184980 | A1* | 8/2006 | Cole | 725/88 |
| 2007/0028264 | A1* | 2/2007 | Lowe | G06F 17/30017 725/35 |
| 2007/0101360 | A1* | 5/2007 | Gutta et al. | 725/34 |
| 2007/0174876 | A1* | 7/2007 | Maggio | H04L 12/2836 725/78 |
| 2007/0266414 | A1* | 11/2007 | Kahn | H04N 7/162 725/113 |
| 2008/0120648 | A1* | 5/2008 | Carlson | H04N 7/17318 725/39 |
| 2008/0262996 | A1* | 10/2008 | Yogeshwar et al. | 707/1 |
| 2009/0031338 | A1* | 1/2009 | Sharkey | G06Q 30/02 725/32 |
| 2009/0094639 | A1* | 4/2009 | Haberman et al. | 725/34 |
| 2009/0249393 | A1* | 10/2009 | Shelton | H04N 5/445 725/39 |
| 2010/0166389 | A1* | 7/2010 | Knee | G11B 27/005 386/241 |
| 2012/0317601 | A1* | 12/2012 | Hong et al. | 725/40 |

FOREIGN PATENT DOCUMENTS

| | | |
|---|---|---|
| EP | 1313329 | 5/2003 |
| GB | 2411786 | 9/2005 |
| GB | 2418314 | 3/2006 |
| WO | WO0064153 | 10/2000 |
| WO | WO0150368 | 7/2001 |
| WO | WO0193474 | 12/2001 |
| WO | WO0209425 | 1/2002 |
| WO | WO2005013623 | 2/2005 |
| WO | WO2006064710 | 6/2006 |
| WO | WO2007047736 | 4/2007 |
| WO | WO2008004181 | 1/2008 |
| WO | WO2008073358 | 6/2008 |

OTHER PUBLICATIONS

IPRP and Written Opinion dated Oct. 12, 2010 regarding PCT/US2009/002201.
Notice of Decision of Rejection dated May 28, 2013 regarding Japan Application No. 2011503995.
First Office Action dated Apr. 25, 2012 regarding China Application No. 200980112715.3.
EP Communication dated Mar. 11, 2013 regarding EP Application No. EP09729744.4.
EP Decision to Refuse European Patent Application dated Apr. 28, 2014 regarding EP Application No. EP09729744.4.
International Search Report dated Jul. 20, 2009 regarding PCT/US2009/002201.
European Search Report and Search Opinion dated Oct. 9, 2014 regarding EP14175106.
Notice of Reasons for Rejection dated Mar. 27, 2014 regarding JP2011-503995.
Canadian Office Action dated Jul. 30, 2015 regarding Canadian Application No. 2,719,670.
EP Communication dated Feb. 2, 2016, regarding EP14175106.5.

\* cited by examiner

METHOD AND APPARATUS FOR CONTENT REPLACEMENT IN LIVE PRODUCTION

This application claims the benefit, under 35 U.S.C. § 365 of International Application PCT/US2009/002201, filed Apr. 8, 2009 which was published in accordance with PCT Article 21(2) on Oct. 15, 2009 in English and which claims the benefit of U.S. provisional patent application No. 61/123,673 filed Apr. 10, 2008.

TECHNICAL FIELD

This invention relates a technique for altering content in live production.

BACKGROUND ART

In many instances, television broadcasters undertake live production of a program, such as live production of a news program, for over-the-air broadcasting. Television stations undertaking such live production often insert advertisements and/or public service announcements (hereinafter collectively referred to as "advertisements") between the content segments. The advent of alternative modes of distribution, such as satellite and cable, afford the opportunity to distribute programs over a much greater geographic area than the reach of traditional over-the-air television broadcast signals. Indeed, the growing popularity and virtually unlimited reach of the Internet as a mode for distribution of television programs affords ever greater opportunities than are available by cable or satellite distribution.

The opportunity to distribute content over a much wider area than previously available gives rise the ability to tailor advertisements for different communities. For example an advertisement for a restaurant or other local establishment will likely not interest distant television viewers. Moreover, the ability to insert different advertisements in a given "time slot" in different geographic areas maximizes revenue because the program producer can sell the same time slot multiple times.

The ability to manipulate previously recorded television content generally poses few difficulties, especially with the advent of sophisticated non-linear editing technology that has become widely available. However, the ability to manipulate content during live production remains problematic. While replacing existing content during live production with content of the same length can occur with little difficulty, problems arise when the replacement content has a different length. Replacement content of a shorter length generally gets padded with filler content, which can alienate a viewer.

Presently, no good method exists for decreasing the overall duration of a live production. For example, imagine that a content segment contains two stories that cannot under live transmission to a web site for what ever reason. The content subscriber viewing such content from the web site would endure minutes of dead air (during the live stream). Attempting to switch to alternate content might not prove feasible if the content is not readily available.

Thus, a need exists for inserting new content into a live stream which overcomes the aforementioned difficulties.

BRIEF SUMMARY OF THE INVENTION

Briefly, in accordance with a preferred embodiment of the present principles, there is provided a method for inserting a new content segment into a time slot between successive content segments played out during live production. The method commences by initially selecting a new content segment for insertion into the time slot whereupon the content segments undergo encoding. Play out of a successive content segment occurs for distribution over at least one of a first set of channels and at least one second channel until the occurrence of the time slot whereupon the new content segment undergoes play out for distribution over the at least one second channel. If the new content segment has a duration longer than the time slot, the length of at least one content segment gets reduced to provide substantially seamless play out.

DETAILED DESCRIPTION

Figure 1:
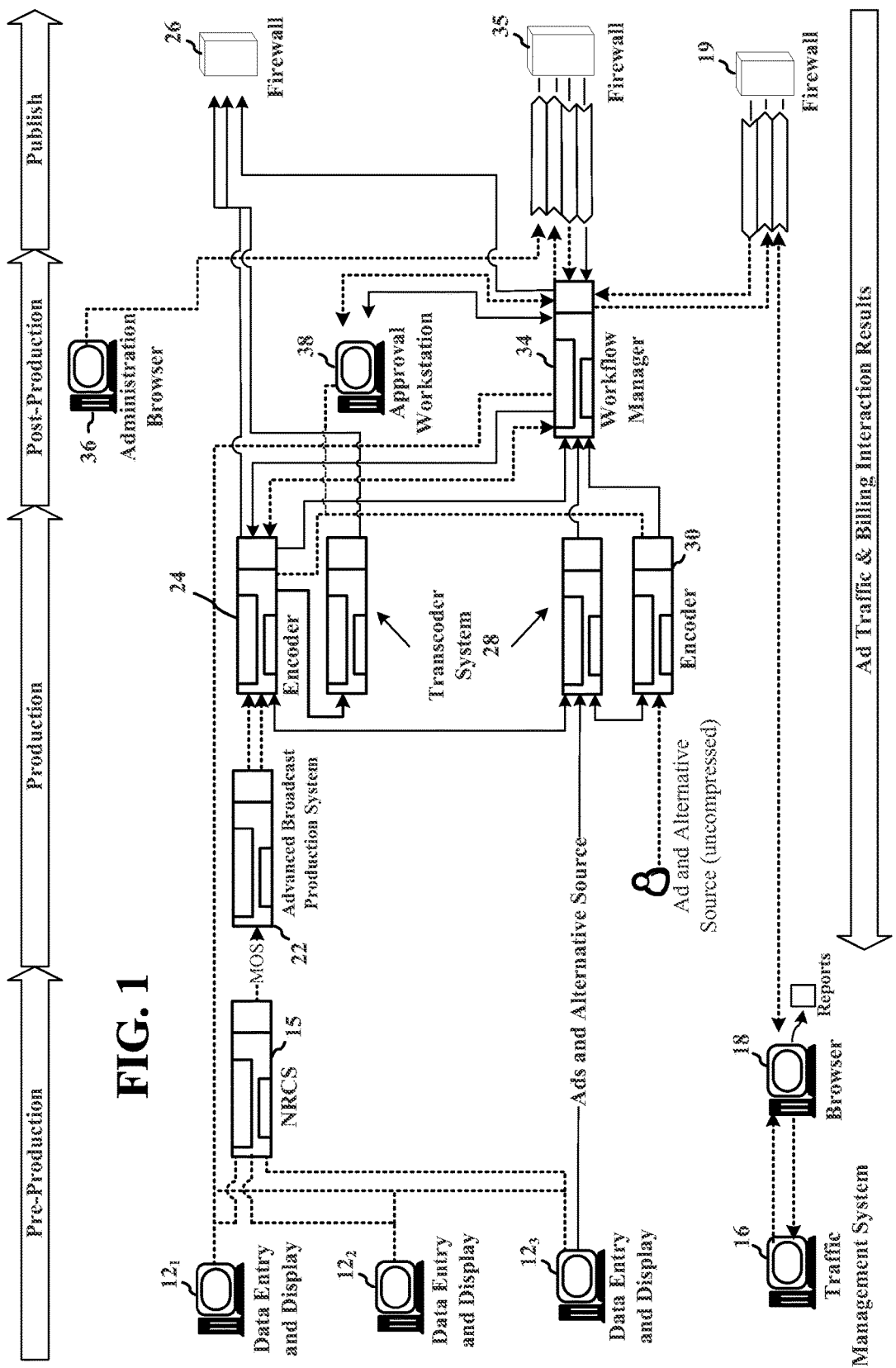
FIG. 1 depicts a block schematic diagram of a system for practicing the content insertion method of the present principles.

FIG. 1 depicts a block schematic diagram of a live show production system 10 in accordance with an illustrative embodiment of the present principles for inserting new content segment (e.g., an advertisement) into a time slot in a stream between successive content segments during live production of a show, typically although not necessarily a television news program. Live production of a show typically has the following phases:
 1. Pre-production;
 2. Production;
 3. Post-Production; and
 4. Publication To facilitate understanding of the live show production system 10, the elements of the system will be described with respect to their roles in connection with (1) pre-production; (2) production; (3) Post-production; and (4) publication. Steps 2 and 4 can interact both with advertising traffic and billing activities.

Pre-Production

The pre-production phase of live content production for a show such as a television new program usually entails the gathering of content segments (e.g., news stories) and associated metadata. To facilitate pre-production of a live show, the live show production system 10 includes at least one and preferably a plurality of data entry and display apparatus, each enabling an operator to enter data and receive displayed information with respect to at least the following activities:
 (1) Web production and editing;
 (2) Newsroom production; and
 (3) Digital news production and asset management.

An operator could make use of a single data entry and display apparatus to enter data and receive information with respect to all three activities (as well as other functions). In practice, different operators often handle (1) web production and editing; (2) newsroom production; and (3) digital news production and asset management, via a corresponding one of data entry and display apparatus $12_1$, $12_2$ and $12_3$, respectively. Each of the data entry and display apparatus $12_1$, $12_2$ and $12_3$ typically takes the form of a conventional video display terminal having an associated keyboard. Alternatively, the data entry and display apparatus 12₁, 12₂ and 12₃ could take different forms, such as desk top or lap top computers, Personal Data Assistants (PDAs) or the like. To the extent that that one or more of (1) web production and editing; (2) newsroom production, and (3) digital news production and asset management activities, requires more than one operator, the live show production system 10 could include additional data entry and display apparatus associated with that activity.

The data entry and display apparatus 12₁-12₃ each link to a news room computer system (NRCS) 14. The NRCS 14 typically includes one or more processors (not shown) and one or more servers (not shown), as well as other devices, all operating under one or more control programs that serve to automate various activities associated with news gathering. For example, the NRCS 14 typically manages and tracks story assignments as among various individuals such as reporters, camera operators and the like. Additionally, the NRCS 14 serves as the point of entry (e.g., the ingest point) for news stories, transcripts and metadata to drive both the automated broadcast system 22 and the encoder 24. Further, the NRCS 14 affords news room personnel, including reporters and editors, the ability to perform at least some editing operations, including the addition of graphics triggered by the automated broadcast system 22 or by the workflow manager 34, thereby allowing such personnel to create content segments stored by the NRCS 14.

As discussed earlier, a live show typically includes one or more advertisements for play out between content segments. Most television stations employ one or more systems, best exemplified by the traffic management system 16, for managing the scheduling of advertisements in terms of the time at which they appear as well as billing of the costs to the parties who contracted for the play-out of such advertisements. Typically, a television station will charge different amounts for advertisements depending on the program in which such advertisements appear. Thus, programs that have many viewers typically command higher advertising rates than less popular programs. By the same token, programs that appear during certain times also can command higher advertising rates than programs that appear during other times. Further, certain segments of the newscast, i.e., weather, top stories, sports, might draw higher revenue than other portions of the newscast.

The traffic management system 16 enjoys a link to a browser 18, typically taking the form of a video display terminal or a personal computer and associated display for providing reports as well as for providing an interface between the traffic system and other elements (described hereinafter) within the system 10. The browser 18 also links to a firewall 19 to enable users with appropriate permission to remotely access the traffic and billing information.

Production

The production phase of live show production generally entails the creation and subsequent execution of a script to assemble and play out a succession of content segments. As an example, production of a live television news program typically entails the play out of previously recorded content segments interspersed with live shots and accompanying audio of on-air talent, live shots of reporters in the field, and or live network feeds. To facilitate the "production" phase, the system 10 includes a broadcast production system 22 that provides either via a standard manual workflow or an automated work flow, such provided in the Ignite Automated Production System available from Thomson Grass Valley, Jacksonville, Fla. The broadcast production system 22 receives content segments from the NRCS 14 which pass typically via the Media Object Server Protocol. The automated broadcast production system 22 typically comprises the combination of one or more computers and associated peripherals such as storage devices, as well one or more broadcast production devices (not shown), such as cameras, video switchers, audio mixers, to name but a few, all under the control of such computer(s). The automated broadcast production system 22 controls the creation and assembly of content segments into a script for automated rundown (e.g., execution of that script) to create a television program for distribution (i.e., publication). To facilitate the live show "production" phase, the live show production system 10 of FIG. 1 also includes a first encoder 24 capable of encoding live audio visual content generated by the automated broadcast system 16 using a particular coding format, such as Windows® Media Video (WMV), to facilitate the transmission of such content to a first firewall 26 for subsequent distribution to subscribers across the Internet or one or more other networks, such as LANs and WANs. The transcoding system 28 transcodes the encoded content from the encoder 24 into other formats such as MPEG 2, H.264 and Apple® Quick Time, to name but a few, to facilitate the transmission of content encoded in such formats to the firewall 26 for subsequent distribution via one or more channels, such as terrestrial over-the-air broadcast and/or distribution over satellite and or cable television systems. The transcoding system 28 also has the ability to specify pre-roll or post-roll content which will be stitched directly into the output file. The Pre-roll or Post-Roll content can either be advertisements or promotional clips which have been stored in the workflow manager 34.

The live show production system 10 of FIG. 1 can include a second encoder 30 for encoding advertisements and alternative source material in uncompressed form into a given format, such as the Windows® Media Video format for distribution to the fire wall 26 for subsequent distribution over the Internet. Additional transcoders (not shown) can be added to the transcoding system to allow asynchronous processing of multiple transcodes.

Post-Production

The "post-production" phase of live show production typically involves the manipulation of content to perform certain tasks, such as editing for example. In the illustrated embodiment of the live show production system 10 of the present principles, such content manipulation can include the insertion of an advertisement, or even new content into a time slot between successive content segments.

To facilitate the "post-production" phase of live television program creation, the system 10 of FIG. 1 includes a work flow manager 34, typically in the form of programmed computer or the like linked to the data entry and display apparatus 12₁, 12₂ and 12₃ as well as to the encoders 24 and 30 and the transcoding system 28. The work flow manager 34 performs various tasks including the management and storage of advertisements, as well as manipulation of content segments to facilitate insertion of an advertisements into a given time slot between content segments. The work flow manager 34 also serves as an interface to digital news production systems (not shown); content streaming systems (not shown) and administration systems (not shown). The work flow manager 34 enjoys a link to a firewall 35 which enables users having appropriate permissions to gain remote access to information generated by the work flow manger.

At least one administration browsing apparatus 36, typically in the form of a video terminal and associated keyboard, links to the work flow manager 34 to enable an operator to access the work flow manager to perform various tasks including controlling content management and distribution. At least one approval work station 38 also possesses a link to the work flow manager 34 to enable an operator to review both live and non-linear edited content and grant approvals for publication.

Publication

The "publication" phase of live show production typically entails the distribution of content to viewers. Traditionally, distribution of a television program produced live entailed terrestrial transmission over the air or transmission to one or more satellite or cable systems. As discussed above, the live show production system 10 advantageously can distribute content over one or more networks, such as the Internet. To facilitate publication (i.e., distribution), over the Internet, the system 10 includes the firewall 19 which, as described previously, serves as a portal to pass television programs to interested subscribers. As discussed, the firewalls 26 and 35 enable users with appropriate permissions to access the live show production system 10 to obtain certain information related to system operation.

Figure 2:
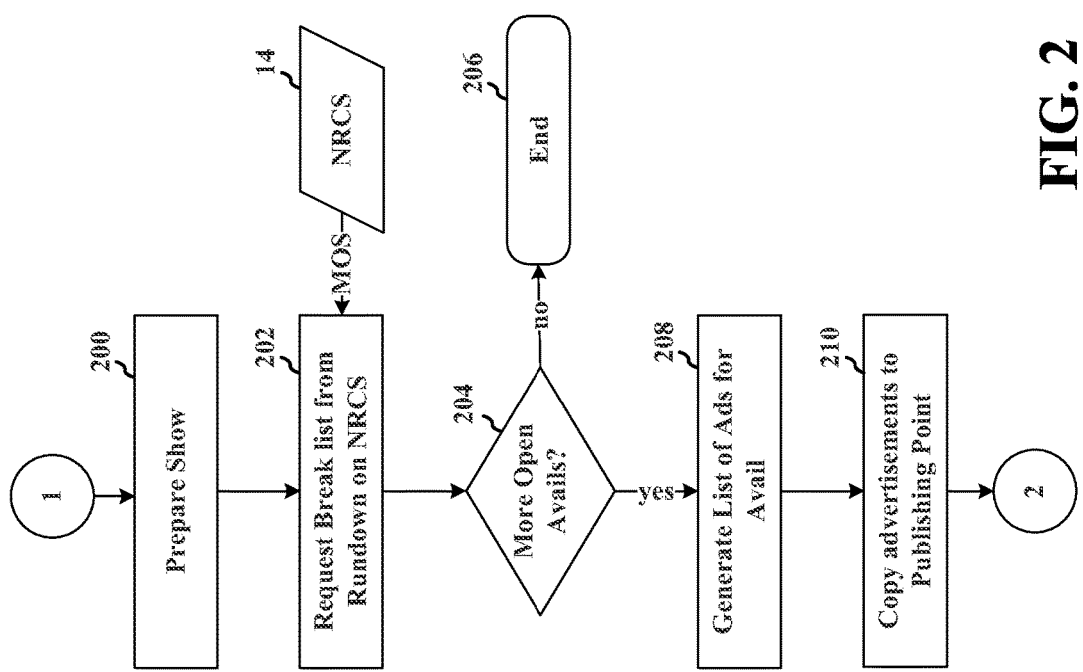
FIG. 2 depicts in flow chart form the steps of a process executed by the system of FIG. 1 ready advertisements and/or new content for insertion into a time slot.

FIG. 2 depicts in flow chart form the general process executed by the live show production system 10 to ready advertisements and/or new content for insertion into a time slot during live production of a show, such as a news program. The process of FIG. 2 commences upon execution of step 200 during which show preparation commences. Typically, a user initiates preparation of a show by entering the appropriate command to the automated broadcast production system 22 of FIG. 1. As discussed previously, preparing a show entails the creation and subsequent execution of a script to assemble and play out a succession of content segments. Such content segments can originate from the NRCS 14.

Following step 200 in FIG. 2, step 202 undergoes execution at which time; the automated broadcast production system 22 of FIG. 1 makes a request to the NRCS 14 of FIG. 1 for list of time slots, between content segments. The list typically identifies each time slot as to its occurrence (in terms of time) as well as its duration. As depicted in FIG. 2, the NRCS 14 provides that information using the Media Object Server protocol. Knowledge of the duration of the time slots is important because an advertisement, when inserted, should fill its associated slot as closely as possible. In some instances, a sequence of advertisements will occupy a time slot. Preferably, the advertisement played out last should possess the ability to be padded in the event an Over-the-Air time slot lasts longer than expected. Station advertisements constitute one example of advertisements that can be padded.

Following step 202, a check occurs during step 204 to determine whether any "open slots exist, that is time slots for which no advertisements have been selected. In practice, time slots undergo processing one at a time. If no open time slots exist, then process execution branches to step 206. Otherwise, process execution branches to step 208 during which each slot gets processed iteratively. For each slot, the work flow manager 34 generates a new "advertisement play list" based on the duration of the time slot. Knowing the duration of the time slot enables selection of an advertisement or a sequence of advertisements for play out by choosing not-yet-shown advertisements whose duration will closely fill the available time.

Following step 208, step 210 undergoes execution at which time, advertisement files get copied from the work flow manager 34 to the encoder 24 to appear at predefined advertising publishing point. The advertising files bear sequential identifiers to enable the encoder 24 to access the advertisements in order.

Figure 3:
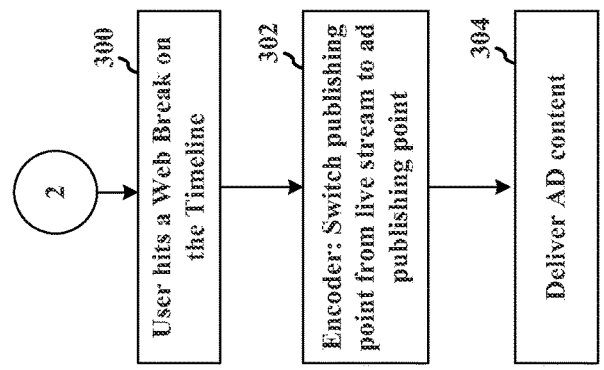
FIG. 3 depicts in flow chart form the steps executed by the system 1 to insert the advertisements and new content readied during the process of FIG. 2 into a time slot.

FIG. 3 depicts in flow chart form the steps of the process executed to insert advertisements. The process commences upon execution of step 300 when a user enters an appropriate commend, typically by way of a computer mouse or the like, to select (i.e., actuate) a particular break (i.e., a time slot) appearing on a time line displayed by the automated broadcast production system 22 of FIG. 1 during publication (i.e., distribution) of a live television program over the Internet. The selection of a particular break triggers the encoder 24 to take account of the time slot destined to receive the inserted advertisement. Following execution of step 300, step 302 undergoes execution, whereupon the encoder 24 of FIG. 1 switches switch from delivering the Over-the-Air Content to the "Over-the-Internet" advertisements, that is, the advertisements copied during step 210 of FIG. 2. The encoder 34 then delivers the advertising content during step 204. The subscriber should receive the "Over-the-Internet" advertisements in a seamless manner. To that end, the encoder 24, if necessary will shorten the length of one or more content segments if the new content segment (e.g., the inserted advertisement) has a length greater than the time slot.

The foregoing describes a technique for replacing content during live production.

The invention claimed is:

1. A system for seamlessly distributing content within live production, the system comprising:

a broadcast production system that assembles a script for automated rundown to distribute a live program, the script including a plurality of content segments comprising audio and video content for the live program that is received from a news room computer system (NRCS);

a database storing a plurality of alternative content segments each having a unique identifier and a respective duration time; and a plurality of encoders including:

a first encoder that encodes the plurality of content segments into a first coding format for linear transmission over of a first set of channels including at least one of a terrestrial television broadcast channel, a cable channel and a satellite channel, a second encoder that encodes the plurality of content segments into a second coding format for non-linear transmission over an internet channel that includes a client-server network of webpages, and a transcoder that encodes the plurality of alternative content segments as uncompressed data for transmission over the internet channel, wherein the broadcast production system includes:

a workflow manger that executes the script and transmits the plurality of content segments encoded in the first coding format as a first data stream as over-the-air content over at least one of the first set of channels and transmits the plurality of content segments encoded in the second coding format as a second data stream as the over-the-air content over the internet channel, a time slot identifier that receives, from the NRCS, at least one time slot within the plurality of content segments, wherein the at least one time slot includes an occurrence time and a duration time associated with the plurality of content segments, an alternative content segment selector that selects, from the database, at least one of the alternative content segments, such that the duration of the selected at least one alternative content segment is within the duration time of the at least one time slot, and an alternative content distributor that seamlessly stitches the uncompressed data of the selected at least one alternative content segment in the second data stream at the occurrence time of the at least one time slot as over-the-internet content over the internet channel, such that the stitched and uncompressed data does not replace any of the plurality of content segments transmitted in the second data stream.

2. The system of claim 1, wherein the alternative content distributor reduces a length of the selected at least one alternative content segment when the selected at least one alternative content segment has a duration time longer than the duration time of the at least one time slot.

3. The system of claim 1, wherein the alternative content distributor pads a length of the selected at least one alternative content segment when the selected at least one alternative content segment has a duration time shorter than the duration time of the at least one time slot.

4. The system of claim 1, wherein the first coding format is one of a MPEG2, a H.264, and an Apple® Quick Time format, and wherein the second coding format is a Windows® Media Video format.

5. The system of claim 1, wherein the plurality of alternative content segments comprise internet advertisements.

6. The system of claim 1, wherein the alternative content distributor seamlessly switches the uncompressed data of the selected at least one alternative content segment in the second data stream, such that the selected at least one alternative content segment is consumed by a receiving device during the identified time slot with no perceivable space between the alternative content segment and the plurality of content segments associated with the identified time slot.

7. A system for distributing content within a live program, the system comprising:

a broadcast production system that assembles a script for automated rundown to distribute a live program, the script including a plurality of content segments comprising audio and video content received from a news room computer system (NRCS);

a database that stores a plurality of alternative content segments each having a respective duration time;

at least one encoder that encodes the plurality of content segments and the plurality of alternative content segments into a first coding format for transmission over an internet channel;

a workflow manager that transmits, when executing the script to distribute the live program, the plurality of content segments encoded in the first coding format as a first data stream as over-the-air content over the internet channel;

a time slot identifier that receives, from the NRCS, at least one time slot associated with the plurality of content segments, wherein the at least one time slot includes an occurrence time and a duration time;

an alternative content selector that selects, from the database, at least one of the alternative content segments based on the duration of the selected at least one alternative content segment and the duration time of the at least one time slot within the plurality of content segments; and an alternative content distributor that seamlessly switches from transmitting the over-the-air content in the first data stream to transmitting the selected at least one alternative content segment as over-the-internet content in the first data stream at the occurrence time of the at least one time slot over the internet channel, such that the transmitted at least one alternative content segment does not replace any of the plurality of content segments transmitted in the first data stream.

8. The system of claim 7, wherein the at least one encoder encodes the plurality of content segments into a second coding format for transmission over of a set of channels including at least one of a terrestrial television broadcast channel, a cable channel and a satellite channel, and wherein the workflow manager transmits, when executing the script to distribute the live program, the plurality of content segments encoded in the second coding format as over-the-air content over at least one of the set of channels.

9. The system of claim 7, wherein the alternative content distributor reduces a length of the selected at least one alternative content segment when the selected at least one alternative content segment has a duration time longer than the duration time of the at least one time slot.

10. The system of claim 7, wherein the alternative content distributor pads a length of the selected at least one alternative content segment when the selected at least one alternative content segment has a duration time shorter than the duration time of the at least one time slot.

11. The system of claim 7, wherein the plurality of alternative content segments comprise internet advertisements.

12. The system of claim 7, wherein the alternative content distributor seamlessly switches from transmitting the over-the-air content in the first data stream to transmitting the selected at least one alternative content segment as over-the-internet content in the first data stream, such that the selected at least one alternative content segment is consumed by a receiving device during the identified time slot with no perceivable space between the alternative content segment and the plurality of content segments associated with the identified time slot.

13. A system for seamless content distribution, the system comprising:

a database for storing a plurality of alternative content segments each having a respective duration time;

a content segment encoder for encoding a plurality of content segments for transmission over at least one internet channel;

an alternative content segment encoder for encoding the plurality of alternative content segments as uncompressed data for transmission over the at least one internet channel; and a broadcast production system including:

a workflow manager for executing a script including at least a portion of the plurality of content segments to create and distribute a program by transmitting the plurality of encoded content segments as a data stream according to the script as over-the-air content over the at least one internet channel, a time slot identifier for identifying at least one time slot within the plurality of content segments, wherein the at least one time slot includes an occurrence time and a duration time, an alternative content segment selector for selecting, from the database, at least one of the alternative content segments based on the duration time of the at least one time slot, and a seamless alternative content distributor for seamlessly stitching the uncompressed data of the selected at least one alternative content segment in the data stream at the occurrence time of the at least one time slot and to be distributed as over-the-internet content over the internet channel.

14. The system of claim 13, wherein the seamless alternative content distributor reduces a length of the selected at least one alternative content segment to seamless distribute the alternative content segment when the selected at least one alternative content segment has a duration time longer than the duration time of the at least one time slot.

15. The system of claim 13, wherein the seamless alternative content distributor pads a length of the selected at least one alternative content segment to seamless distribute the alternative content segment when the selected at least one alternative content segment has a duration time shorter than the duration time of the at least one time slot.

16. The system of claim 13, wherein the plurality of alternative content segments comprise internet advertisements.

17. The system of claim 13, wherein the alternative content distributor seamlessly switches the uncompressed data of the selected at least one alternative content segment in the second data stream, such that the selected at least one alternative content segment is consumed by a receiving device during the identified time slot with no perceivable space between the alternative content segment and the plurality of content segments associated with the identified time slot.

18. A system for seamlessly inserting an advertisement in an open time slot within a plurality of audio and video content segments to be distributed not only linearly across a network of broadcast channels, but also non-linearly across a network of Internet websites, the system comprising:
  a content encoding configuration manager configured to encode a plurality of audio and video content segments into linear and non-linear encoded formats so as to configure the plurality of audio and video content segments to be distributed not only linearly across a network of broadcast channels in a broadcast data stream, but also non-linearly across a network of Internet websites in an Internet data stream;
  an open time slot identifier configured to identify an open time slot within the encoded plurality of audio and video content segments;
  an advertisement segment encoder configured to encode an advertisement segment into the non-linear transmission encoded format so as to configure the advertisement segment to be non-linearly transmitted over the internet channel; and
  a seamless advertisement segment inserter configured to seamlessly insert the encoded advertisement segment in the Internet data stream at the identified open time slot within the encoded plurality of audio and video content segments without replacing the encoded plurality of audio and video content segments in the Internet data stream such that both the encoded plurality of audio and video content and the inserted and encoded advertisement segment in the Internet data stream are configured to be non-linearly distributed across the network of Internet websites.

19. The system of claim 18, further comprising a seamless content distributor that transmits the plurality of encoded content segments as over-the-air content in the data stream and is configured to switch to transmit the encoded advertisement segment as over-the-internet content in the data stream.

20. The system of claim 18, wherein the seamless advertisement segment inserter seamlessly inserts the encoded advertisement segment in the data stream by reducing a length of the encoded advertisement segment when the encoded advertisement segment has a duration time longer than a duration time of the at least one time slot.

21. The system of claim 20, wherein the seamless advertisement segment inserter seamlessly inserts the encoded advertisement segment in the data stream by first padding a length of the at least one alternative content segment when the at least one alternative content segment has a duration time shorter than a duration time of the at least one time slot.

22. The system of claim 19, wherein the seamless content distributor encodes the encoded advertisement segment in the data stream in an uncompressed form for distribution of the at least one internet channel.

23. The system of claim 22, wherein the uncompressed form is a Windows® Media Video format.

24. The system of claim 18, wherein the seamless advertisement segment inserter seamlessly inserts the encoded advertisement segment in the Internet data stream at the identified open time slot, such that the inserted, encoded advertisement segment is consumed by a device receiving the Internet data stream during the identified time slot with no perceivable space between the advertisement segment and the plurality of audio and video content segments associated with the identified time slot.

25. A system for seamlessly inserting an advertisement in an open time slot within a plurality of audio and video content segments to be distributed not only linearly across a network of broadcast channels, but also non-linearly across a network of Internet websites, comprising:
  a content production, encoding and distribution manager configured to encode a plurality of audio and video content segments into linear and non-linear encoded formats so as to configure the plurality of audio and video content segments to be distributed not only linearly across a network of broadcast channels in a broadcast data stream, but also non-linearly across a network of Internet websites in an Internet data stream;
  an open time slot identifier configured to identify an open time slot within the encoded plurality of audio and video content segments;
  an advertisement segment encoder configured to encode an advertisement segment into the non-linear transmission encoded format so as to configure the advertisement segment to be non-linearly transmitted over the Internet channel; and
  a seamless advertisement segment insertion module configured to seamlessly insert the encoded advertisement segment in the Internet data stream at the identified open time slot within the encoded plurality of audio and video content segments without altering the encoded plurality of audio and video content segments in the data stream such that both the encoded plurality of audio and video content and the inserted and encoded advertisement segment in the Internet data stream are configured to be non-linearly distributed across the network of Internet websites,
  wherein the encoded advertisement segment has a first duration and the identified open time slot has a second duration, and
  wherein the seamless advertisement segment insertion module is configured to seamlessly insert the encoded advertisement segment in the open time slot within the encoded plurality of audio and video content segments by changing the first duration of the encoded advertisement segment to fit the second duration of the identified open time slot without altering the encoded plurality of audio and video content segments in the data stream.

26. The system of claim 25, wherein when the first duration of the encoded advertisement segment is greater than the second duration of the open time slot, the seamless advertisement segment insertion module is configured to seamlessly insert the encoded advertisement segment in the open time slot within the encoded plurality of audio and video content segments by decreasing the first duration of the encoded advertisement segment so as to fit the second duration of the identified open time slot.

27. The system of claim 25, wherein when the first duration of the encoded advertisement segment is less than the second duration of the open time slot, the seamless advertisement segment insertion module is configured to seamlessly insert the encoded advertisement segment in the open time slot within the encoded plurality of audio and video content segments by increasing the first duration of the encoded advertisement segment so as to fit the second duration of the identified open time slot.

28. The system of claim 25, wherein the advertisement segment encoder is configured to encode the advertisement segment in an uncompressed media video format so as to be transmitted over the Internet channel.

29. The system of claim 25, wherein the seamless advertisement segment insertion module seamlessly inserts the encoded advertisement segment in the Internet data stream at the identified open time slot, such that the inserted, encoded advertisement segment is consumed by a device receiving the Internet data stream during the identified time slot with no perceivable space between the advertisement segment and the plurality of audio and video content segments associated with the identified time slot.

* * * * *